US011897728B2

(12) United States Patent
Kattainen

(10) Patent No.: US 11,897,728 B2
(45) Date of Patent: Feb. 13, 2024

(54) ELEVATOR HAVING FREE FALL PROTECTION SYSTEM

(71) Applicant: KONE Corporation, Helsinki (FI)

(72) Inventor: Ari Kattainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 201 days.

(21) Appl. No.: 17/081,421

(22) Filed: Oct. 27, 2020

(65) Prior Publication Data

US 2021/0139277 A1 May 13, 2021

(30) Foreign Application Priority Data

Nov. 8, 2019 (EP) ..................................... 19208023

(51) Int. Cl.
*B66B 5/00* (2006.01)
*B66B 5/04* (2006.01)
(Continued)

(52) U.S. Cl.
CPC .............. *B66B 5/0031* (2013.01); *B66B 5/04* (2013.01); *B66B 5/185* (2013.01); *B66B 11/002* (2013.01); *B66B 11/009* (2013.01)

(58) Field of Classification Search
CPC ..... B66B 5/0031; B66B 5/185; B66B 11/009; B66B 5/04; B66B 11/002; B66B 7/062
See application file for complete search history.

(56) References Cited

U.S. PATENT DOCUMENTS 296,315 A 4/1884 Chandler
7,080,717 B2 * 7/2006 Ito .......................... B66B 5/185 188/65.1

(Continued)

FOREIGN PATENT DOCUMENTS

DE 11 2009 004 733 T5 11/2012
DE 102016125559 A1 * 6/2018

(Continued)

OTHER PUBLICATIONS

Wegener, Device for Stopping an Elevator Installation, Machine translation of EP 0980842 A1, Feb. 23, 2000 (Year: 2000).*

(Continued)

*Primary Examiner* — Michael R Mansen
*Assistant Examiner* — Michelle M Lantrip
(74) *Attorney, Agent, or Firm* — Birch, Stewart, Kolasch & Birch, LLP

(57) ABSTRACT

An elevator includes a car, a counterweight, and a hoisting member connecting the car with the counterweight over a traction sheave. A free fall protection system includes a free fall protection controller, a free fall protection member connecting the car with the counterweight over the traction sheave or over a separate free fall sheave. The car and the counterweight are supported by the hoisting member in normal operation and by the free fall protection member only in a situation in which the hoisting member support fails. At least one free fall protection brake is arranged to (Continued)

Figure 1:
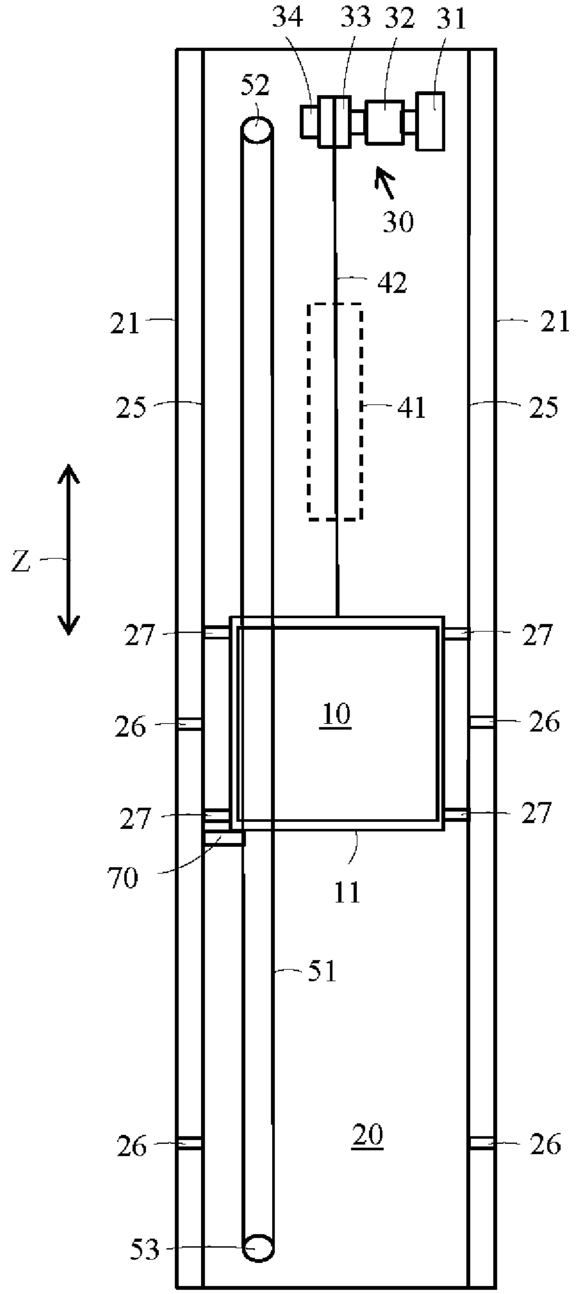
FIG. 1 (Prior art)

stop the movement of the free fall protection member and thereby also the movement of the car and/or the counterweight, when being activated by the free fall protection controller.

19 Claims, 3 Drawing Sheets

(51) Int. Cl.
*B66B 5/18* (2006.01)
*B66B 11/00* (2006.01)

(56) References Cited

U.S. PATENT DOCUMENTS

| | | | | |
|---|---|---|---|---|
| 7,543,690 | B2 * | 6/2009 | Eckenstein | B66B 5/185 188/137 |
| 2010/0018810 | A1 * | 1/2010 | Yumura | B66B 5/02 187/258 |
| 2014/0353089 | A1 | 12/2014 | Shani et al. | |
| 2016/0200550 | A1 * | 7/2016 | Reuter | B66B 5/185 187/254 |
| 2017/0217729 | A1 * | 8/2017 | Lehtinen | D07B 1/22 |
| 2020/0122969 | A1 * | 4/2020 | Varon | F16H 25/20 |

FOREIGN PATENT DOCUMENTS

| | | | | |
|---|---|---|---|---|
| EP | 0980842 | A1 * | 2/2000 | B66B 1/32 |
| EP | 1 612 179 | A1 | 1/2006 | |
| EP | 1864936 | A1 * | 12/2007 | B66B 1/32 |
| EP | 1 927 567 | A1 | 6/2008 | |
| KR | 100444976 | B1 * | 8/2004 | B66B 1/3484 |
| KR | 10-0731196 | B1 | 6/2007 | |
| WO | WO-2004076325 | A1 * | 9/2004 | B66B 5/185 |
| WO | WO 2014/068186 | A1 | 5/2014 | |
| WO | WO-2018029986 | A1 * | 2/2018 | B66B 1/18 |
| WO | WO-2021084012 | A1 * | 5/2021 | B66B 1/3484 |

OTHER PUBLICATIONS

Definition of “support” from the Oxford English Dictionary (Year: 2023).*
Search Report issued in European priority application 19208023.2, dated May 11, 2020.

* cited by examiner

ELEVATOR HAVING FREE FALL PROTECTION SYSTEM

FIELD

The invention relates to an elevator.

BACKGROUND

An elevator may typically comprise a car, an elevator shaft, hoisting machinery, a hoisting member, and a counterweight. A car frame may surround and support the car or the car frame may form an integral part of the car. The hoisting machinery may be positioned in a machine room or in the shaft and may comprise a drive, an electric motor, a traction sheave, and a machinery brake. The hoisting machinery may move the car in a vertical direction upwards and downwards in the vertically extending elevator shaft. The car frame may be connected to the counterweight with the hoisting member passing over the traction sheave. The car frame may further be supported with guiding means on guide rails extending along the height of the shaft. The guide rails may be supported with fastening brackets on the side wall structures of the shaft. The guiding means may engage with the guide rails and keep the car in position in the horizontal plane when the car moves upwards and downwards in the elevator shaft. The counterweight may be supported in a corresponding way on guide rails supported on the wall structure of the shaft. The elevator car may transport people and/or goods between the landings in the building. The elevator shaft may be formed so that the wall structure is formed of solid walls or so that the wall structure is formed of an open steel structure.

A requirement in safety regulations is that elevators should be provided with a free fall protection system. Small elevators in low buildings may typically be provided only with a safety gear in connection with the car. Elevators in high buildings and elevators having accessible spaces below the shaft, should be provided with a safety gear in connection with the car and a safety gear in connection with the counterweight. An overspeed governor sheave, a safety gear and an overspeed governor (OSG) rope connecting the overspeed governor sheave and the safety gear have traditionally been used as a free fall protection system in elevators. The OSG rope runs over the OSG sheave in a top portion of the shaft and a lower tension pulley in a bottom portion of the shaft. The OSG rope is traditionally tightened with the lower tension pulley. The inertia of the rotating parts of the OSG and the OSG rope may, however, cause problems in fast elevators. An abrupt emergency stop by machinery brakes together with the above mentioned inertia may cause an unintentional activation of the safety gear.

The weight of the OSG rope will already as such cause a problem in high-rise buildings.

An OSG rope runs close to the stationary structures in the shaft and the tension of the OSG rope is distinctly less than that of the hoisting ropes. Swaying and bending of the building may cause the OSG rope to become tangled in the shaft structures. In areas that are prone to excessive building sway, due e.g. to strong winds or earthquakes, operation of the elevators is interrupted if the building sway exceeds a safety limit.

The gripping of the safety gears on the guide rails must be considered when dimensioning the guide rails. This may increase the dimensions of the guide rails compared to a situation in which only the ride comfort, the horizontal accelerations and the uneven load of the car must be considered.

Prior art solutions exist in which the OSG sheave at the top of the shaft and the OSG rope loop have been replaced with a static OSG rope and an OSG located in connection with the car and operating the safety gear directly. A static OSG rope solves the problem of the rope inertia and partially also the problem relating to the swaying OSG rope. The safety gear may also, as a further alternative, be electrically activated. The electrically activated safety gear solves the problems relating to the OSG rope. Such a prior art solution requires, however, that accumulators are positioned in the car in order to be able to operate the OSG also in case there is a black-out. Furthermore, it may be impossible to release the safety gear with an electrical control if the car cable has been damaged.

SUMMARY

An object of the present invention is an elevator provided with a novel free fall protection system and a method for controlling an elevator provided with a novel free fall protection system.

The elevator according to the invention is defined in claim 1.

The elevator comprises:

- a car, a counterweight, and a hoisting member connecting the car with the counterweight over a traction sheave.

The elevator is characterized in that the elevator further comprises a free fall protection system comprising

- a free fall protection controller,
- a free fall protection member connecting the car with the counterweight over the traction sheave or over a separate free fall sheave, whereby the pre-tensioning load of the free fall protection member is less than the pre-tensioning load of the hoisting member so that the car and the counterweight are supported by the hoisting member in normal operation and by the free fall protection member only in a situation in which the hoisting member support fails,
- at least one free fall protection brake device arranged to stop the movement of the free fall protection member and thereby also the movement of the car and/or the counterweight, when being activated by the free fall protection controller.

The method for controlling an elevator according to the invention is defined in claim 12.

The free fall protection member does not in normal operation carry any significant part of the load of the car and the counterweight. The load of the car and the counterweight is in normal operation carried by the hoisting member. This situation can be achieved by having a lower pre-tensioning load in the free fall protection member compared to the pre-tensioning load in the hoisting member. The pre-tensioning load of the free fall protection member need only be such that the free fall protection member is kept in its track on the pulleys. The car and the counterweight are fully supported by the free fall protection member only in a situation in which the hoisting member fails.

The elevator free fall protection system eliminates the overspeed governor rope and the problems associated with this.

The elevator free fall protection system eliminates further the safety gears of the car and/or of the counterweight. The slings of the car may thus be dimensioned for a retardation of e.g. 0.5 g instead of the normal 1 g.

Also the construction of the guide rails may be lighter as there will be no safety gears gripping the guide rails.

The problem of the guide rails falling on the jack-bolts when the safety gears are activated is thus also eliminated in the invention.

If the car deceleration is monitored and automatically controlled at the shaft ends to prevent buffer run at excessive speeds, there is no need for a jump preventing lock-down apparatus in the elevator due to the invention. The reason is that the machinery brake and the free fall protection brake may be dimensioned so that the retardation of the car and/or the counterweight does not, in a situation in which all brakes are activated, exceed 0.5 g. Such a jump preventing lock-down apparatus is normally required in elevators having a speed over 3 m/s.

The car may always be moved to a landing from the machine room. There is no need to consider a situation in which the car and/or the counterweight cannot be moved because the safety gears cannot be opened to so there will be no need for rescuing people from one car to another.

Any kind of speed detector may be used in connection with the elevator free fall protection system. The speed detector may be based on electronic devices e.g. it may be based on one or more acceleration sensors or it may be based on encoder data. The encoder may be used to measure the rotation speed of the traction sheave or the sheave of the free fall protection rope in case a separate sheave for the free fall protection rope is used. The speed detector may on the other hand be based on mechanical devices e.g. a roller acting on the car guide rail.

The free fall protection system may further comprise a speed detector measuring the speed and/or the acceleration-deceleration directly or indirectly of the car and/or the counterweight, whereby the free fall speed controller is arranged to activate the at least one free fall protection brake device when an abnormal speed and/or acceleration-deceleration is detected.

The elevator free fall protection system may be used in connection with any kind of elevators. The elevator free fall protection system is especially suitable to be used in high-rise buildings in which the elimination of the OSG rope, the safety gear and the anti-rebound device is a big advantage. There is no generally accepted definition of the term "high-rise building", but one could consider that buildings having a height of more than 50 meter could be called high-rise building. The height of high-rise buildings could be several hundred meters.

The hoisting member in an elevator may be formed of round or of flat ropes. The hoisting member may be of steel and/or of polymer. Flat ropes made of carbon fibres sealed in high-friction polymer may advantageously be used as hoisting ropes in elevators in high-rise buildings. The weight of such flat ropes made of carbon fibres sealed in high-friction polymer is much less than the weight of corresponding steel ropes. Such flat ropes made of carbon fibres sealed in high-friction polymer are sold e.g. under the trade name KONE UltraRope®.

DRAWINGS

Figure 2:
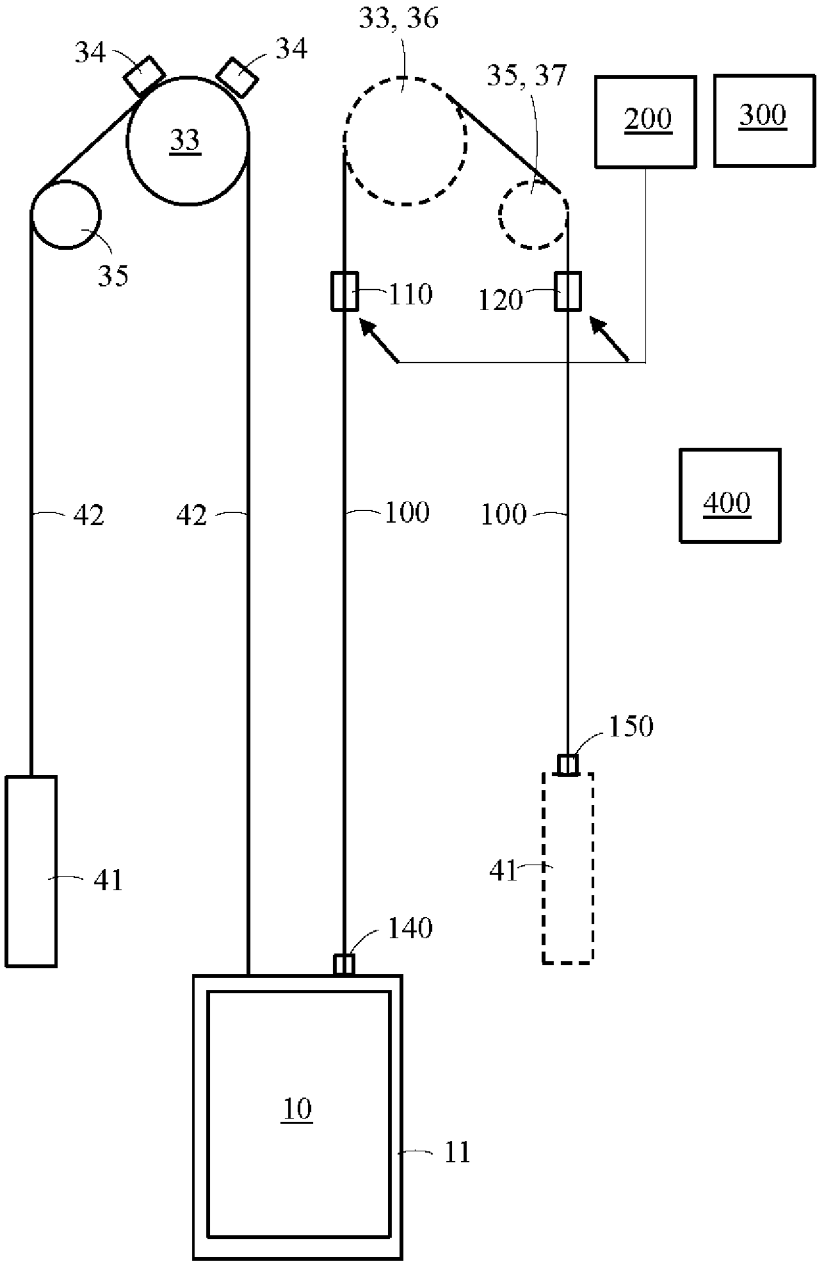
Figure 3:
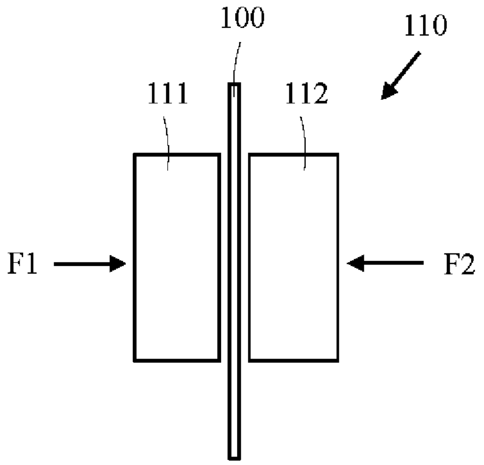

The invention will in the following be described in greater detail by means of preferred embodiments with reference to the attached drawings, in which FIG. 1 shows a side view of an elevator, FIG. 2 shows a schematic presentation of the inventive arrangement, FIG. 3 shows a brake device which can be used in the invention.

DETAILED DESCRIPTION

FIG. 1 shows a side view of a prior art elevator.

The elevator may comprise a car 10, an elevator shaft 20, hoisting machinery 30, a hoisting member 42, and a counterweight 41. A separate or an integrated car frame 11 may surround the car 10.

The hoisting machinery 30 may be positioned in a machine room or in the shaft 20. The hoisting machinery may comprise a drive 31, an electric motor 32, a traction sheave 33, and a machinery brake 34. The hoisting machinery 30 may move the car 10 in a vertical direction Z upwards and downwards in the vertically extending elevator shaft 20. The machinery brake 34 may stop the rotation of the traction sheave 33 and thereby the movement of the elevator car 10.

The hoisting member 42 may be formed of one or more hoisting ropes or hoisting belts running in parallel.

The car frame 11 may be connected to the counterweight 41 with the hoisting member 42 passing over the traction sheave 33. The car frame 11 may further be supported with guiding means 27 at guide rails 25 extending in the vertical direction in the shaft 20. The guiding means 27 may comprise rollers rolling on the guide rails 25 or gliding shoes gliding on the guide rails 25 when the car 10 is moving upwards and downwards in the elevator shaft 20. The guide rails 25 may be attached with fastening brackets 26 to the side wall structures 21 in the elevator shaft 20. The guiding means 27 keep the car 10 in position in the horizontal plane when the car 10 moves upwards and downwards in the elevator shaft 20. The counterweight 41 may be supported in a corresponding way on guide rails that are attached to the wall structure 21 of the shaft 20.

The car 10 may transport people and/or goods between the landings in the building. The elevator shaft 20 may be formed so that the wall structure 21 is formed of solid walls or so that the wall structure 21 is formed of an open steel structure.

The figure shows further a prior art speed limiter system based on a mechanical pulley and a rope system. The system comprises an OSG sheave 52 mounted e.g. in the upper part of the elevator shaft 20, a tensioning pulley 53 mounted in the lower part of the elevator shaft 20 and an OSG rope 51 fitted to run in a substantially tight closed loop around the OSG sheave 52 and the tensioning pulley 53. A mechanical linkage system may connect the OSG rope 51 to the safety gears 70. The OSG rope 51 runs around the OSG sheave 52 and the tensioning pulley 53 when the car 10 is moving. If the elevator car 10 and thereby also the OSG rope 51 move at an excessive speed, then the rotation of the OSG sheave 52 in the upper part of the elevator shaft 20 is stopped by a mechanism activated e.g. by centrifugal force and at the same time the OSG rope 51 also stops moving. The stationary OSG rope 51 will exert a pull on the mechanical linkage system at the car that is still moving, causing the safety gears 70 to grip the car guide rails 25, thereby stopping the car 10.

FIG. 2 shows a schematic presentation of the inventive arrangement.

The left-hand side of the figure shows the hoisting member 42 connecting the car 10 with the counterweight 41 over the traction sheave 33. The hoisting member 42 runs further from the traction sheave 33 via a first diverter pulley 35 to the counterweight 41. The first diverter pulley 35 directs the hoisting member 42 from the traction sheave 33 into a position straight above the counterweight 41. The machinery brakes 34 act on a rotation part in the hoisting machinery 30 comprising the drive 31, the electric motor 32, and the traction sheave 33 (see FIG. 1).

The right-hand side of the figure shows the inventive elevator free fall protection system. The elevator free fall protection system comprises a free fall protection member 100 connecting the car 10 and the counterweight 41. The free fall protection member 100 may run from the car 10 over the traction sheave 33 and the first diverter pulley 35 to the counterweight 41. The free fall protection member 100 may on the other hand instead of running over the traction sheave 33 and the first diverter pulley 35 run over a separate free fall sheave 36 and a separate second diverter pulley 37.

The free fall protection member 100 may be attached to the sling 11 of the car 10 with a first termination device 140 and to the counterweight 41 with a second termination device 150. The first 140 and the second 150 termination device may be separate and independent in relation to the corresponding termination devices of the hoisting member 42.

The free fall protection system comprises further at least one free fall protection brake device 110, 120. The embodiment in the figure comprises two free fall protection brake devices 110, 120. A first free fall protection brake device 110 may act on the free fall protecting member 100 between the traction sheave 33 or the separate free fall sheave 36 and the car 10. A second free fall protection brake device 120 may act on the free fall protection member 100 between the counterweight 41 and the first diverter pulley 35 or between the counterweight 41 and the second diverter pulley 37.

There might be elevator constructions in which the first diverter pulley 35 and the second diverter pulley 37 may not be necessary. The hoisting member 42 would then run only over the traction sheave 33. The free fall protection member 100 would then in a corresponding way run only over the traction sheave 33 or only over the separate free fall sheave 36.

The use of two free fall protection brake devices 110, 120 is an advantageous embodiment, but the invention could be realized with only one free fall protection brake device 110, 120. The second free fall protection brake device 120 could in such case be left out. The use of two free fall protection brake devices 110, 120 on opposite sides of the sheave-pulley combination 33, 35 and 36, 37 will eliminate building-up of slack of the free fall protection member 100 on the sheave-pulley combination 33, 35 and 36, 37 in case the free fall protection brake devices 110, 120 are activated. The use of two free fall protection brake devices 110, 120 makes it also easier to achieve a big enough contact surface between the free fall protection member 100 and the brake shoes in the free fall protection brake devices 110, 120.

The two free fall protection brake devices 110, 120 may be controlled with a free fall protection controller 200.

An emergency power supply 300 for supplying power to the free fall protection controller 200 and to the free fall protection brake devices 110, 120 may further be provided. The emergency power supply 300 provides power to the free fall protection brake devices 110, 120 during a black-out eliminating activation of the free fall protection brake devices 110, 120 during the black-out.

The free fall protection brake devices 110, 120, the free fall protection controller 200 and the emergency supply device 300 may be positioned in the machine room in an elevator provided with a machine room. The free fall protection brake devices 110, 120, the free fall protection controller 200 and the emergency supply device 300 may on the other hand be positioned in the shaft 20 in connection with the traction sheave 33 in an elevator lacking a machine room.

The car 10 and the counterweight 41 are in a normal operational situation of the elevator supported only by the hoisting member 42. The free fall protection member 100 may be pre-tensioned so that the car 10 and the counterweight 41 are supported by the free fall protection member 100 only in a situation in which the hoisting member 42 support fails. The hoisting member 42 support could fail e.g. in a case in which the hoisting member 42 breaks or the rope termination of the hoisting member 42 breaks.

The hoisting member 42 may be dimensioned so that the safety factor of the hoisting member 42 is at least 12, whereby the safety regulations of an elevator are fulfilled.

The free fall protection member 100 may on the other hand be dimensioned so that the safety factor of the free fall protection member 100 is 2 to 8, advantageously 3 to 6. The safety factor of the free fall protection member 100 may thus be much lower than the safety factor of the hoisting member 42. The safety factor of the free fall protection member 100 may be in the range of 25% to 50% of the safety factor of the hoisting member 42.

The pre-tensioning load of the free fall protection member 100 may be less than 50%, preferably less than 10% of the pre-tensioning load of the hoisting member 42. A considerably lower pre-tension of the free fall protection member 100 compared to the pre-tension of the hoisting member 42 will ensure that only the hoisting member 42 carries to load of the car 10 and the counterweight 41 during normal operation of the elevator.

The figure shows also a speed detector 400. Any kind of speed detector 400 may be used in connection with the free fall protection controller 200. The speed detector 400 may be based on electronic devices e.g. it may be based on one or more acceleration sensors or it may be based on encoder data. The encoder may measure the rotation speed of a sheave or pulley in the system on which the machinery brake does not act. The speed detector 400 may on the other hand be based on mechanical devices e.g. a roller acting on the car guide rail 25.

FIG. 3 shows a brake device which can be used in the invention.

The first brake device 110 and the second brake device 120 may comprise a first brake part 111 on a first side of the free fall protection member 100 and a second brake part 112 on the opposite side of the free fall protection member 100. The two brake parts 111, 112 may be movable in a direction towards each other and in an opposite direction apart from each other. The two brake parts 111, 112 may further be fixed in relation to the direction in which the free fall protection member 100 moves. The two brake parts 111, 112 may thus in a braking situation be pressed with a predetermined force F1, F2 against opposite sides of the free fall protection member 100. The free fall protection brake 110 is released when the two brake parts 111, 112 are moved apart from each other so that the free fall protection member 100 can again move freely between the two brake parts 111, 112. The brake device 110 could be realized also so that only one of the brake parts 111, 112 is movable.

The two brake parts 111, 112 may be electromechanically operated by an electromagnet. The two brake parts 111, 112 may be spring loaded so that the two brake parts 111, 112 are urged towards the free fall protection member 100 when the current to the electromagnet is disrupted i.e. the electromagnet is deactivated. The brake is thus on when the electromagnet is deactivated. The force F1, F2 caused by the springs acting on the two brake parts 111, 112 and the friction between the two brake parts 111, 112 and the free fall protection member 100 will stop the movement of the free fall protection member 100 between the two brake parts 111, 112. The movement of the car 10 and/or the counterweight 41 will thereby also be stopped.

The electromagnet is activated by connecting a current to the electromagnet, whereby the electromagnetic force produced by the electromagnet will pull the two brake parts 111, 112 in opposite directions away from each other. The electromagnetic force produced by the electromagnet is greater than the force F1, F2 produced by the springs. The free fall member 100 is thus free to move between the two brake parts 111, 112.

The free fall protection controller 200 may activate the free fall protection brakes 110, 120 e.g. in the following events:

The speed of the free fall protection member 100 is too high.

The speed of the car 10 and/or the counterweight 41 is too high.

The car 10 does not decelerate fast enough when the car 10 approaches an obstacle in the shaft 20, such as an end of the shaft 20 or another car 10 moving in the shaft 20.

The car 10 does not decelerate fast enough during a normal emergency stop of the elevator.

The free fall protection brake devices 110, 120 may also be activated manually e.g. in case the machinery brakes 34 are to be serviced.

The free fall protection brake devices 110, 120 may be released manually when the car 10 is to be moved in a situation in which the free fall protection controller 200 is not working or there is a blackout.

The free fall protection controller 200 may be arranged so that it is possible to control the free fall protection brake devices 110, 120 gradually.

There is no need to dimension the free fall protection brake devices 110, 120 for a free fall situation in the same way as the safety gears have to be dimensioned. It is enough to dimension the free fall protection brake devices 110, 120 so that they can stop the absolute maximum imbalance of the elevator.

The free fall protection brake devices 110, 120 may be dimensioned so that the combined deceleration of the machinery brakes 34 and the free fall protection brakes 110, 120 does not in any case exceed 0.5 g. An Emergency Terminal Speed Limiting (ETSL) system may further be used in order to secure that the car 10 never bumps against the buffer with a speed over 3 m/s, whereby there is no need for a jump preventing lock-down apparatus in the elevator.

The hoisting member 42 may be formed of at least one belt having a generally flat cross section or at least one rope having a generally round cross-section. The hoisting member 42 may be formed of several belts or ropes running in parallel. The material of the belt or rope may be steel and/or fibre reinforced polymer.

The free fall protection member 100 may also be formed of at least one belt having a generally flat cross section or at least one rope having a generally round cross-section. The free fall protection member 100 may be formed of several ropes running in parallel. The material of the belt or rope may be steel and/or fibre reinforced polymer.

The hoisting member 42 may on the other hand be formed of at least one flat or round rope or cable made of carbon fibres sealed in high-friction polymer. The hoisting member 42 may be formed of several flat or round ropes or cables made of carbon fibres sealed in high-friction polymer running in parallel.

The free fall protection member 100 may also be formed of at least one flat or round rope or cable made of carbon fibres sealed in high-friction to polymer. The free fall protection member 100 may be formed of several flat or round ropes or cables made of carbon fibres sealed in high-friction polymer running in parallel.

Flat ropes made of carbon fibres sealed in high-friction polymer are sold e.g. under the trade name KONE UltraRope®.

In case the free fall protection member 100 is formed of several separate ropes having a generally round cross section or a generally flat cross-section, one could use a separate free fall protection brake 110, 120 for each rope or a common free fall protection brake 110, 120 for all the separate free fall protection ropes making up the free fall protection member.

The figures show a situation in which the free fall protection brake devices 110, 120 are arranged to act directly on the free fall protection member 100. Another possibility would be to have a brake acting on the free fall sheave 36 of the free fall protection system. This solution could be used when the free fall protection member 100 runs over a separate free fall sheave 36. The free fall protection brake device 110, 120 would then be arranged to act indirectly on the free fall protection member 100 via the free fall sheave 36.

The use of the invention is not limited to the elevator disclosed in the figures. The figure shows an elevator with a 1:1 suspension ratio, but the invention may be used in elevators with any suspension ration e.g. 2:2, 4:1, 1 etc. The invention can be used in any type of elevator e.g. an elevator comprising a machine room or lacking a machine room. The counterweight could be positioned on either side wall or on both side walls or on the back wall of the elevator shaft. The drive, the motor, the traction sheave, and the machine brake could be positioned in a machine room or somewhere in the elevator shaft. The car guide rails could be positioned on opposite side walls of the shaft or on a back wall of the shaft in a so called ruck-sack elevator.

It will be obvious to a person skilled in the art that, as the technology advances, the inventive concept can be implemented in various ways. The invention and its embodiments are not limited to the examples described above but may vary within the scope of the claims.

The invention claimed is:

1. An elevator comprising:

a car;

a counterweight;

a hoisting member connecting the car with the counterweight over a traction sheave; and a free fall protection system comprising:

a free fall protection controller;

a free fall protection member connecting the car with the counterweight over the traction sheave or over a separate free fall traction sheave, whereby a pre-tensioning load of the free fall protection member is less than a pre-tensioning load of the hoisting member, so that the car and the counterweight are supported by the hoisting member in normal operation and by the free fall protection member alone only in a situation in which the hoisting member support fails; and at least one free fall protection brake device arranged to stop the movement of the free fall protection member and thereby also the movement of the car and/or the counterweight, when being activated by the free fall protection controller, wherein a first end of the free fall protection member is attached to the car and a second end of the free fall protection member is attached to the counterweight.

2. The elevator according to claim 1, wherein the free fall protection system further comprises a speed detector measuring the speed and/or the acceleration-deceleration directly or indirectly of the car and/or the counterweight, whereby the free fall speed controller is arranged to activate the at least one free fall protection brake device when an abnormal speed and/or acceleration-deceleration is detected.

3. The elevator according to claim 1, wherein the free fall protection system further comprises a speed detector measuring a speed of the free fall protection member, whereby the free fall speed controller is arranged to activate the at least one free fall protection brake device when the speed of the free fall protection member exceeds a predetermined value.

4. The elevator according to claim 1, wherein the free fall protection system comprises a speed detector measuring a speed of the car and/or the counterweight, whereby the free fall protection controller is arranged to activate the at least one free fall protection brake device when the speed of the car and/or the counterweight exceeds a predetermined value.

5. The elevator according to claim 1, wherein the free fall protection system comprises a speed detector measuring an acceleration-deceleration of the car, whereby the free fall protection controller is arranged to activate the at least one free fall protection brake device when the car does not decelerate fast enough when the car approaches an obstacle in the shaft.

6. The elevator according to claim 1, wherein the free fall protection system comprises a speed detector measuring an acceleration-deceleration of the car, whereby the free fall protection controller is arranged to activate the at least one free fall protection brake device when the car does not decelerate fast enough in a normal emergency stop of the elevator.

7. The elevator according to claim 1, wherein the pre-tensioning load of the free fall protection member is less than 50% of the pre-tensioning load of the hoisting member.

8. The elevator according to claim 1, wherein the pre-tensioning load of the free fall protection member is less than 10% of the pre-tensioning load of the hoisting member.

9. The elevator according to claim 1, wherein the hoisting member is formed of at least one flat or round rope made of carbon fibres sealed in high-friction polymer.

10. The elevator according to claim 1, wherein the free fall protection member is formed of at least one flat or round rope made of carbon fibres sealed in high-friction polymer.

11. The elevator according to claim 1, wherein a first free fall protection brake device of the at least one free fall protection brake device is positioned on a run of the free fall protection member between the car and the traction sheave or between the car and the separate free fall traction sheave.

12. The elevator according to claim 1, wherein a second free fall protection brake device of the at least one free fall protection brake device is positioned on the run of the free fall protection member between the counterweight and the traction sheave or the separate free fall traction sheave.

13. The elevator according to claim 1, wherein the free fall protection member is attached to the car with a first termination device and to the counterweight with a second termination device, the first termination device and the second termination device being separate and independent in relation to the corresponding termination devices of the hoisting member.

14. A method for controlling an elevator, the elevator comprising:

a car;

a counterweight;

a hoisting member connecting the car with the counterweight over a traction sheave; and a free fall protection system comprising:

a free fall protection controller;

a free fall protection member connecting the car with the counterweight over the traction sheave or over a separate free fall traction sheave, whereby a pre-tensioning load of the free fall protection member is less than a pre-tensioning load of the hoisting member, so that the car and the counterweight are supported by the free fall protection member alone only in a situation in which the hoisting member support fails, wherein a first end of the free fall protection member is attached to the car and a second end of the free fall protection member is attached to the counterweight; and at least one free fall protection brake device arranged to stop the movement of the free fall protection member and thereby also the movement of the car and/or the counterweight, the method comprising the step of activating the at least one free fall protection brake device with the free fall protection controller to stop the movement of the free fall protection member and thereby also the movement of the car and/or the counterweight when the hoisting member support fails.

15. The method according to claim 14, wherein the free fall protection controller activates the at least one free fall protection brake device when an abnormal speed and/or acceleration-deceleration, measured with a speed detector directly or indirectly of the car and/or the counterweight, is detected.

16. The method according to claim 14, wherein the free fall protection controller activates the at least one free fall protection brake device when a speed of the free fall protection member exceeds a predetermined value.

17. The method according to claim 14, wherein the free fall protection controller activates the at least one free fall protection brake device when a speed of the car and/or the counterweight exceeds a predetermined value.

18. The method according to claim 14, wherein the free fall protection controller activates the at least one free fall protection brake device when a speed of the car does not decelerate fast enough when the car approaches an obstacle in the shaft.

19. The method according to claim 14, wherein the free fall protection controller activates the at least one free fall protection brake device when a speed of the car does not decelerate fast enough in a normal emergency stop of the elevator.

* * * * *